H. N. ANDERSON.
GEAR FORMING MACHINE.
APPLICATION FILED AUG. 8, 1911.

1,240,913.

Patented Sept. 25, 1917.
6 SHEETS—SHEET 3.

UNITED STATES PATENT OFFICE.

HAROLD N. ANDERSON, OF DAYTON, OHIO, ASSIGNOR TO THE ANDERSON ROLLED GEAR COMPANY, OF CLEVELAND, OHIO, A CORPORATION OF OHIO.

GEAR-FORMING MACHINE.

1,240,913.  Specification of Letters Patent.   Patented Sept. 25, 1917.

Application filed August 8, 1911. Serial No. 643,010.

*To all whom it may concern:*

Be it known that I, HAROLD N. ANDERSON, a citizen of the United States, residing at Dayton, county of Montgomery and State of Ohio, have invented certain new and useful Improvements in Gear-Forming Machines, of which the following is a full, clear, and exact description.

My invention relates to machines for forming gear teeth by rolling the face of a gear blank against a toothed member, pressing the blank and said member together with sufficient force to cause the teeth of the toothed member to sink into and form teeth on the blank. In Patent Number 1,001,799, issued August 29, 1911, I showed and described a machine wherein the toothed member was circular; in the present application a machine will be shown and described in which the toothed member is in the form of a rack bar. In either style of machine, an important factor in the attainment of accuracy in the gears thereby formed is fixed speed ratio between the toothed member and the blank; *i. e.*, the lineal velocity of the imaginary line on the blank, which, when it has become a finished gear, will be known as its pitch-line, must be equal to the pitch-line velocity of the toothed member from the time the operation of forming the teeth is begun until it is completed whatever the condition of the blank may be when the tooth-forming operation begins: for example, the blank may have been previously treated by other suitable mechanism. In the construction shown in the patent referred to the speed ratio was not quite fixed, although it was substantially so, and one of the objects of my present invention is to provide means whereby, in machines of this character, fixed speed ratio may be maintained between the toothed member and the blank, thereby maintaining synchronous relations between the teeth on the toothed-member and those on the blank.

As before stated, a machine is shown and described in this application in which a rack bar is used for forming the teeth. A machine of this type may be so constructed that the blank is rolled along a stationary rack bar; or a rectilineally moving rack bar and a stationary rotating blank may be pressed against each other. In other words, the teeth are formed by pressing the rack bar and blank together, contemporaneous with characteristic relative movement of each; *i. e.*, rectilineal movement of the rack bar with reference to the blank, and rotary movement of the blank with reference to the rack bar. Generically it is immaterial which method is employed, so I have illustrated but one, that of a stationary rotating gear and a rectilineally movable rack bar.

One of the advantages of forming gear teeth by the rolling process is that teeth so formed are more dense, and consequently more durable than teeth formed by other methods. In the mechanism hereinafter described, which will be referred to as the machine, provision is made for separating the rack bar and the blank at intervals, and while separated to change their relative positions in such a way that when they are again brought together the teeth of the rack bar will act upon other teeth on the blank than those they last acted upon. By this means unequal treatment of the teeth, if the effective length of the rack bar is not exactly divisible by the circumference of the blank, is avoided; furthermore the effects of inaccuracy or imperfections in the rack bar are thereby neutralized, and gears of remarkable accuracy produced.

In the accompanying drawings.

Similar numerals refer to similar parts throughout the several views.

The base 25 carries two pairs of parallel vertical guides 26, each pair being connected by a yoke 27 which carries a set screw 28 and jam-nut 29. A bearing 30 is mounted to slide vertically between each pair of guides 26 and carry a shaft 31; suitable collars preserve the correct longitudinal position of this shaft. Each bearing has a depending boss 32, which is threaded to receive one end of a right and left screw 33. The lower ends of the screws screw into bosses formed on the base 25. Each screw carries a pinion 34, which is enmeshed with an intermediate gear 35. A rectangular frame 36 has apertures through which the screws 33 pass, the pinions 34 being confined within the frame; this frame acts as a support for the gear 35 and carries a suitable shaft upon which the gear rotates. The altitude of the shaft 31 can be adjusted by rotating the gear 35, and when so adjusted it can be maintained by screwing the set screws 28 down on the bearings.

The shaft 31 protrudes at one end beyond its bearings and is turned down to form a shoulder 40. A gear 41 and sleeve 42 are fixed on the reduced portion of the shaft; the key 43 and a set screw, which is not shown, unite the shaft, gear and sleeve into a rotatable unit. A stud 44, threaded at its outer end, is fixed in the end of the shaft. A bush 45, having a flange 46 at one end, is threaded to fit the stud 44. The other end of the bush is threaded to receive a nut 47; the threaded parts of the bush and the nut have each a key way. The bush is inserted in the central aperture of a disk 48, after which the nut 47 is screwed on the bush, brought to a point where the key ways register and a key inserted. The end of the sleeve 42 is made slightly conical, and the portion adjacent thereto is threaded; a threaded ring 49 is screwed on the sleeve for a purpose to be hereafter explained.

The base 25 has a forwardly projecting extension 60 carrying a rectilineal guide 61. A carriage 62 is mounted upon said guide and adapted to slide freely thereon, although having substantially no lateral play. Bearings 63, carried by the base 25, have journaled therein the shaft 64 which carries a fly-wheel 65 and a pulley 66; the shaft and fly-wheel are rotated by means not shown. Reciprocating motion is imparted to the carriage by a pitman 67, one end of which is attached to the fly-wheel and the other end to a vertical plate 68 rigidly attached to the carriage 62.

A shaft 70 is rigidly mounted in each end of the carriage, and projecting at each end beyond the carriage the ends of this shaft form studs on which are journaled guide blocks 71. A platform 72 has depending end members 73 having parallel opposed faces; the carriage 62 being the necessary length and its ends parallel, the platform is adapted to set down over the carriage and move up or down freely, but without end play. A rock-shaft 74 is journaled in each member 73, and on one end of each of these a short arm 75 is rigidly secured. The free ends of these arms have rectangular openings which embrace the guide blocks 71. A lever 76 is rigidly secured to the other end of each rock shaft 74; these levers extend toward each other and one of them carries a stud 77 and a roller 78. Each lever 76 has a rectangular opening which embraces one of the guide blocks 71. The lever carrying the roller is connected to the other lever at a point approximately in alinement with the axis of the roller by a slot and pin connection which is not shown. When the roller 78 is lifted the platform is lowered, and when the roller is moved downward the platform is lifted. The roller runs in a slot 80 formed in an upturned portion of the extension 60; the greater part of the length of this slot is horizontal, but near one end it inclines upward for a short distance and then continues in a line parallel with the lower part. At each stroke of the carriage the roller is carried approximately the full length of the slot and returned; therefore the platform is elevated during the greater part of the stroke and dropped for a brief period at one end thereof. The object of this will be explained presently.

Figure 5:
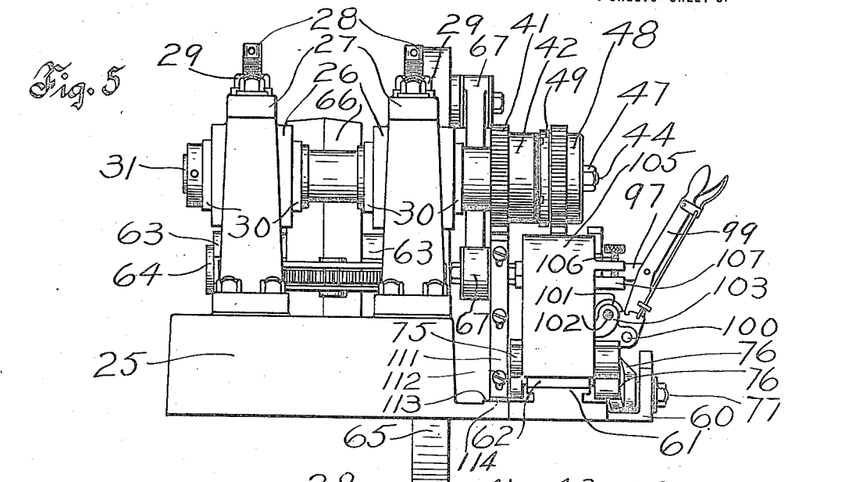
Fig. 5 is an end elevation.
Figures 6, 7:
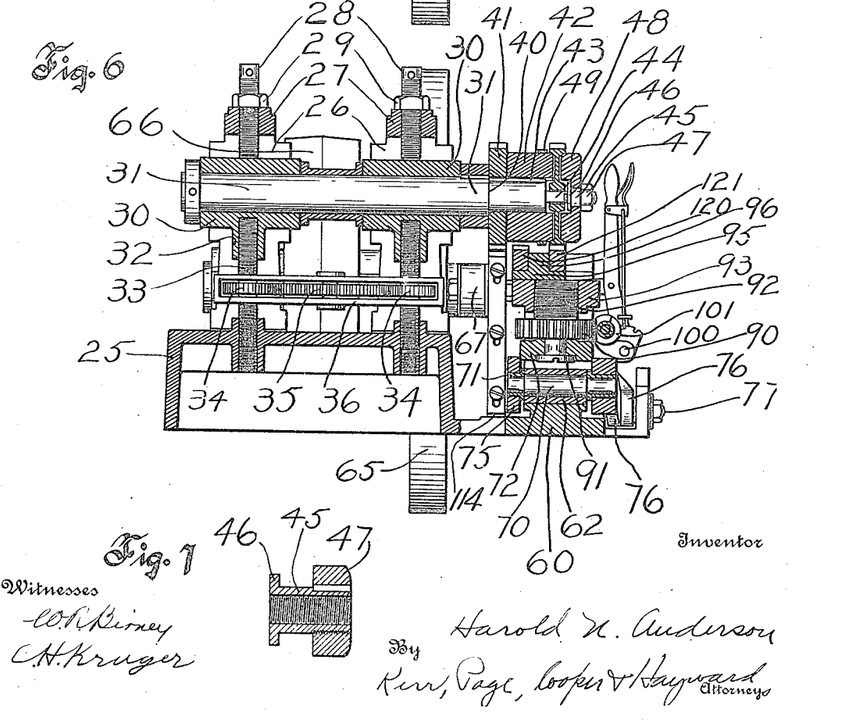
Fig. 6 is a transverse section on lines 6—6 6—6 Fig. 4.
Fig. 7 is a detail of construction.
Figure 8:
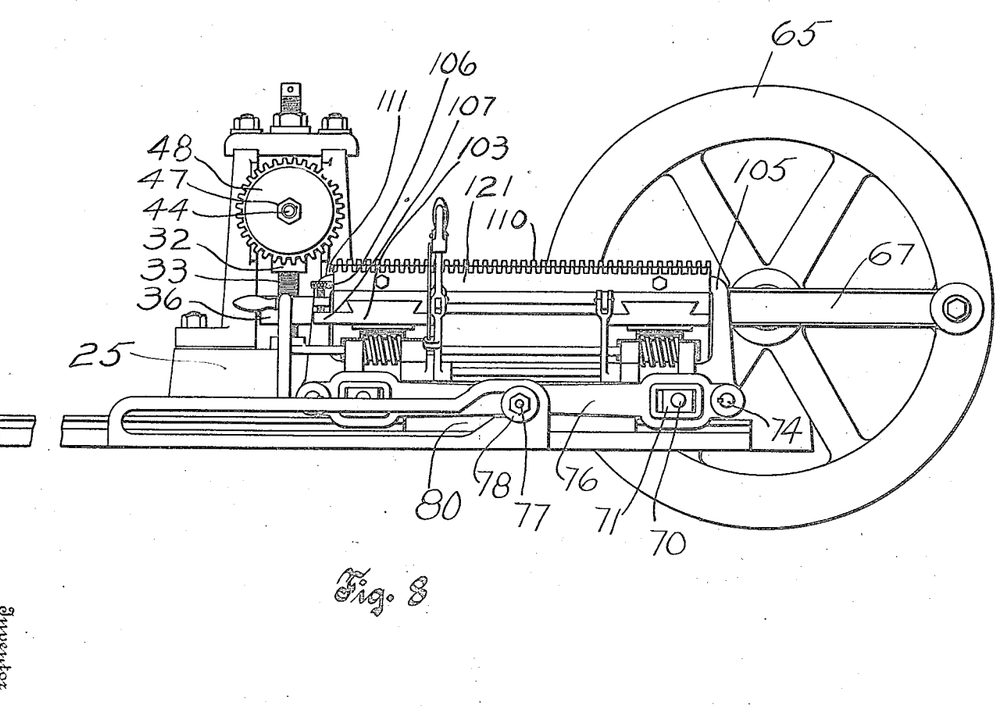
Fig. 8 is another front elevation, but with the carriage at one end of its stroke.

Near each end of the platform a worm gear 90 is rotatably mounted upon a vertical axis; a shoulder screw 91, journaled in the platform, screws up into the gear and forms a pivot upon which the gear revolves. A screw 92 extends upward from each gear and screws into a slide-rest 93; each slide-rest has a transversely disposed guide 94 on which one end of a rack bar carrier 95 slides. The carrier 95 has a vertical rib 96, on each side of which lies a rack bar; bolts pass through one of said racks and the rib 96 and screw into the other rack, thereby securing both racks firmly to the carrier 95. The lateral position of the carrier is maintained by a pair of links 97 attached to lugs on the carrier 95. The other ends of the links are attached respectively to levers 98 and 99, which are in turn rigidly secured to a rock-shaft 100; the shaft rocks in bearings formed in lugs carried by the platform 72. The rack bar carrier can be placed and held in either of two positions by the lever 99, the operation of which will be readily understood by reference to Figs. 5 and 6. The worm gears are simultaneously rotated for the purpose of raising or lowering the rack bars by worms 101 secured to shaft 102; the shaft is journaled in lugs 103 and is turned with a hand wheel 104. While the rack bar carrier is movable vertically and transversely, longitudinal play is prevented by guides 105 integral with and extending upward from the platform 72. A thumb screw 106, mounted in a lug carried by one of the guides 105, limits the upward movement of the rack bars by engaging a lug 107 projecting from one of the slide rests 93. The object of this will be explained later.

Figures 9, 10:
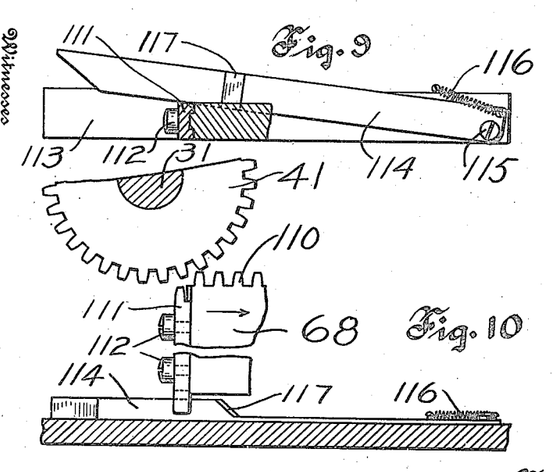
Figs. 9 to 15 inclusive are details of the mechanism for rotating the blank while the tooth-forming rack bar is disengaged.
Figures 11, 12:
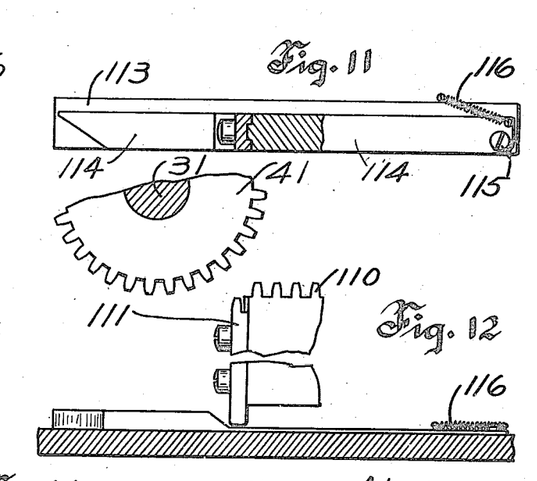
Figure 13:
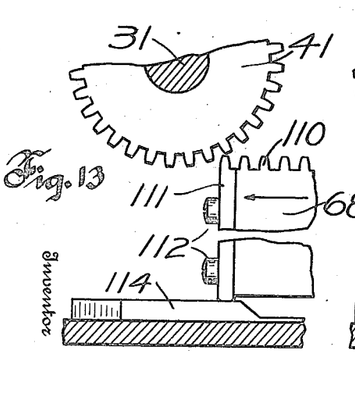
Figure 14:
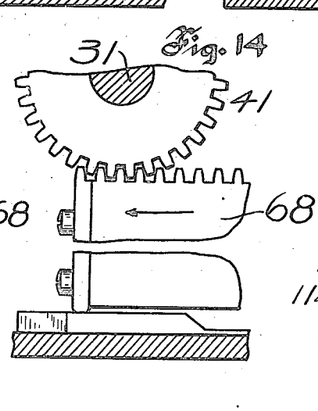

A rack bar 110 is formed on the upper edge of the vertical plate 68; or, as is preferable, the rack may be formed on a separate piece and attached to the plate. A vertical strip 111 is attached to one end of the plate 68 (see Figs. 9 to 14) by screws 112; slots in the strip permit it to move up and down within limits indicated by Figs. 13 and 10 respectively. A spline formed on the plate 68, fitting into a groove in the strip, supplements the guiding function of the screws. A slightly raised pad 113 is formed on the base 25, on which a lever 114 lies; the lever is pivotally attached to the base at 115 and is normally held in the position shown in Fig. 11 by a spring 116. The free end of the lever is oblique, and toward the latter end of the movement of the carriage in the direction of the arrow in Fig. 10 the lower end of the strip 111 engages this oblique end of the lever and cams it to one side, as in Fig. 9. It will be observed that the free end of the lever is quite thick compared with the pivotted end; the thick and the thin parts of the lever are united by an inclined part 117. The stroke of the carriage carries the strip 111 past the thick portion of the lever 114, and as soon as this occurs the spring restores the lever to its normal position. As the carriage returns, the incline 117 cams the strip 111 upward into the position shown in Figs. 13 and 14.

Figure 15:
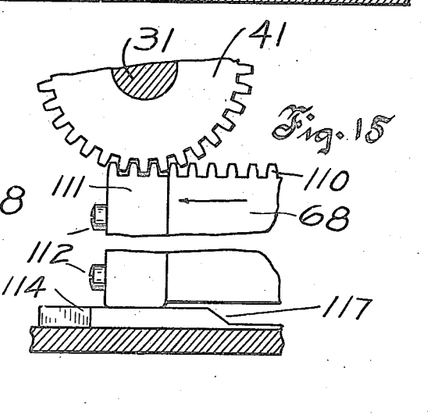

The gear 41 is rotated backward and forward by the rack 110 as the later reciprocates. When the rack passes out of enmeshment with the gear it leaves the gear in the position shown in Fig. 9, the last tooth in the rack being the one to place it in that position. It will be noted that the rack leaves the gear at a time when the pitman 67 is about to pass over the dead center; therefore, the rack and gear are moving so slowly as to insure the gear remaining just where the last tooth in the rack left it. After the pitman passes over the center and the carriage starts back, the strip 111 is lifted as in Fig. 13 and its upper end, which has been given the form of a gear tooth, enters the space in the gear just vacated by the last tooth of the rack. Acting as a tooth it rotates the gear slightly and brings the next space into position to receive the said last tooth, now the first tooth, of the rack, resulting in the gear being advanced one tooth with reference to the rack; in like manner the gear is made to advance one tooth at each stroke of the carriage. In Fig. 15 the strip is made wide enough to carry three teeth, which will cause the gear to advance three teeth at each stroke of the carriage. Obviously, the number of teeth in the strip may be varied to suit the requirements.

Figure 1:
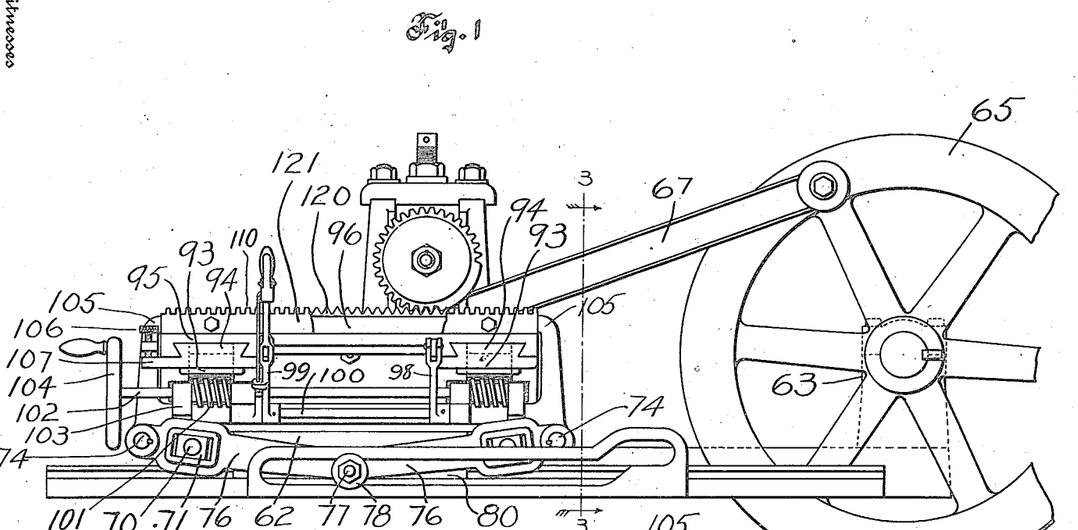
Figure 1 is a front elevation of the machine, showing the first operation being performed on a blank—that of notching it with the breaking-down rack bar.
Figure 2:
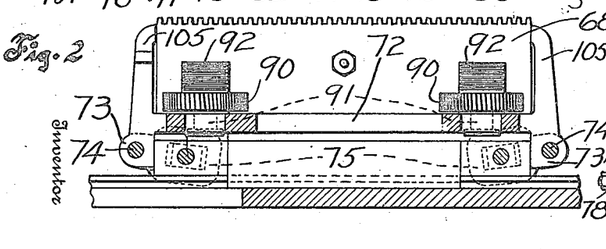
Fig. 2 is a view from the same point, with some portions removed.
Figure 3:
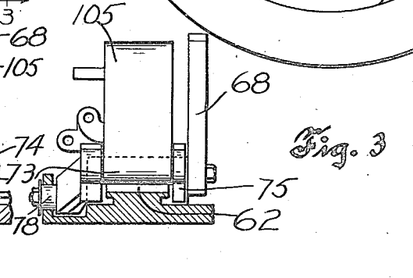
Fig. 3 is a section on line 3—3, Fig. 1, some parts being removed.
Figure 4:
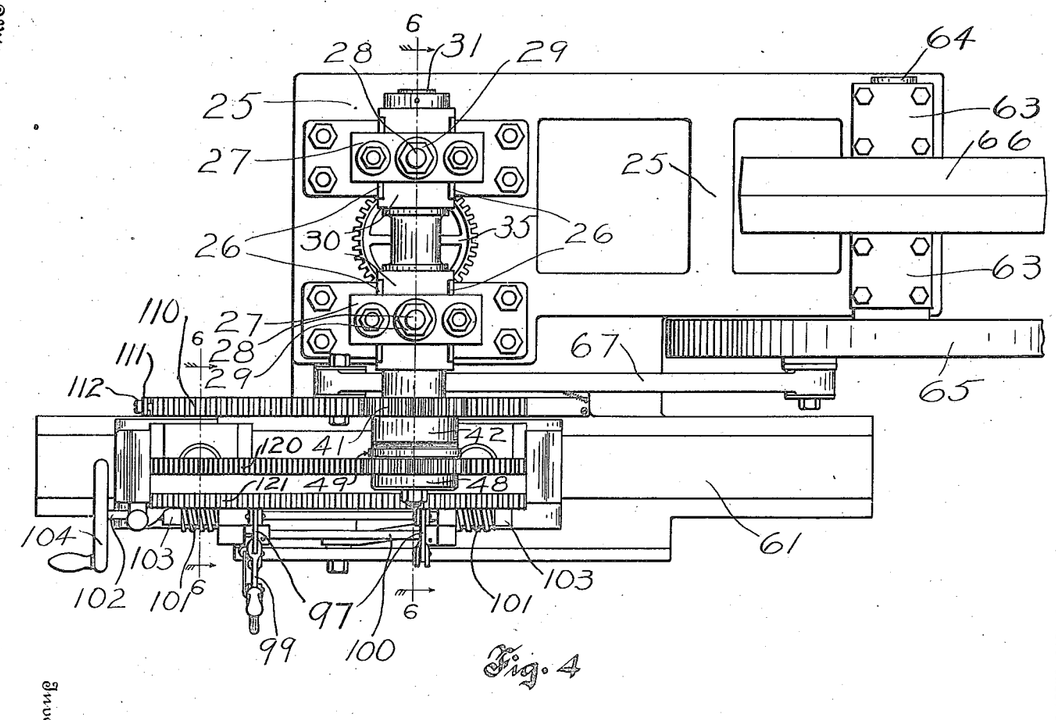
Fig. 4 is a plan.

The operation of the machine will now be described: By means of the gear 35 the gear 41 is enmeshed to the proper depth in the rack 110, the set screws 28 screwed down to the bearings and the jam nuts 29 tightened. A gear blank, preferably heated, is clamped between the end of the sleeve 42 and the face of the disk 48 by screwing the bush 45 onto the stud 44. By reference to Fig. 1 it will be seen that the rack bars carried by the carrier 95 have different shaped teeth; the breaking down rack, 120, has V shaped teeth, and the finishing rack, 121, has standard teeth. Assuming that the carrier has been drawn forward, as in Fig. 5, as soon as the blank is in place the flywheel is started to rotating; as the carriage moves backward and forward, rotating the gear 41 and the blank, the rack bars 120 and 121 are lifted by means of the hand wheel 104 and its associated mechanism, bringing the breaking down rack bar into contact with the blank. The automatic raising and lowering of the platform and all the parts carried by it, including the rack bars 120 and 121, is so timed that it is lowered just before the rack 110 passes out of engagement with the gear 41, and is lifted again after the rack 110 has reëngaged the gear. It is evident, therefore, that the tooth-forming racks are out of engagement with the blank at the time the gear is being advanced by the strip 111. When the desired effect has been produced by the breaking-down rack the carrier is lowered by a reverse movement of the hand wheel 104, shifted by the lever 99 so as to bring the finishing rack into line with the blank, and again raised by turning the hand wheel; the carrier is then gradually raised, accompanied by the reciprocal movement of the carriage, till the teeth on the blank have attained the proper depth. The set screw 106 should be set to check the upward movement of the carrier when the teeth have attained their proper dimensions. When the blank is finished the machine is stopped and the blank removed. It will be observed that the edge of the disk 48 is beveled thereby converting a portion of the disk into a cone similar to the conical end of the sleeve 42. The conical portion of the disk has more taper than that of the sleeve 42. By the time a blank is finished the rolling and pressure it has been subjected to will have caused its overhanging portions to cling very closely to the beveled portions of the sleeve and disk, and it will cling tightest to the one having the least taper. When the bush 45 is unscrewed the flange 46 forcibly draws the disk 48 away from the sleeve 42; the sleeve having less taper than the disk 48 the blank will cling to it, while the disk is forced to separate from the blank; after the disk is removed, the blank is removed from the sleeve by turning the ring 49.

Since the gear 41 and the blank rotate as a unit; i. e., as if they were integral, a circle drawn on the blank of the same diameter as the pitch-circle of the gear 41 would necessarily have the same lineal velocity as the said pitch-circle from start to finish of the tooth-forming operation; therefore, since the depth of enmeshment of the rack 110 and gear 41 is constant, and the tooth-forming racks are incapable of longitudinal displacement with reference to the rack 110, it is clear that the lineal velocity of the blank is equal to that of the racks, and therefore to that of their pitch-lines.

As the effective length of the tooth-forming rack may not equal the circumference of the blank, certain parts of the blank may receive more or less treatment than other parts. By advancing or backing the blank with reference to the tooth-forming rack one or more teeth at each stroke of the rack; i. e., changing the relative lineal position of their pitch-lines, all parts of the blank will ultimately receive equal treatment. Whether the blank should be advanced one, or more teeth at a stroke depends upon conditions, and is a matter to be determined by the operator. From the foregoing it will be seen that the length of the tooth-forming rack is of no particular consequence, and the same one may be used to form teeth on gears of various diameters. It is necessary, however, to change the gear 41 for different sizes of blanks, as the pitch-diameters of each must be the same.

Figures 16, 17, 18:
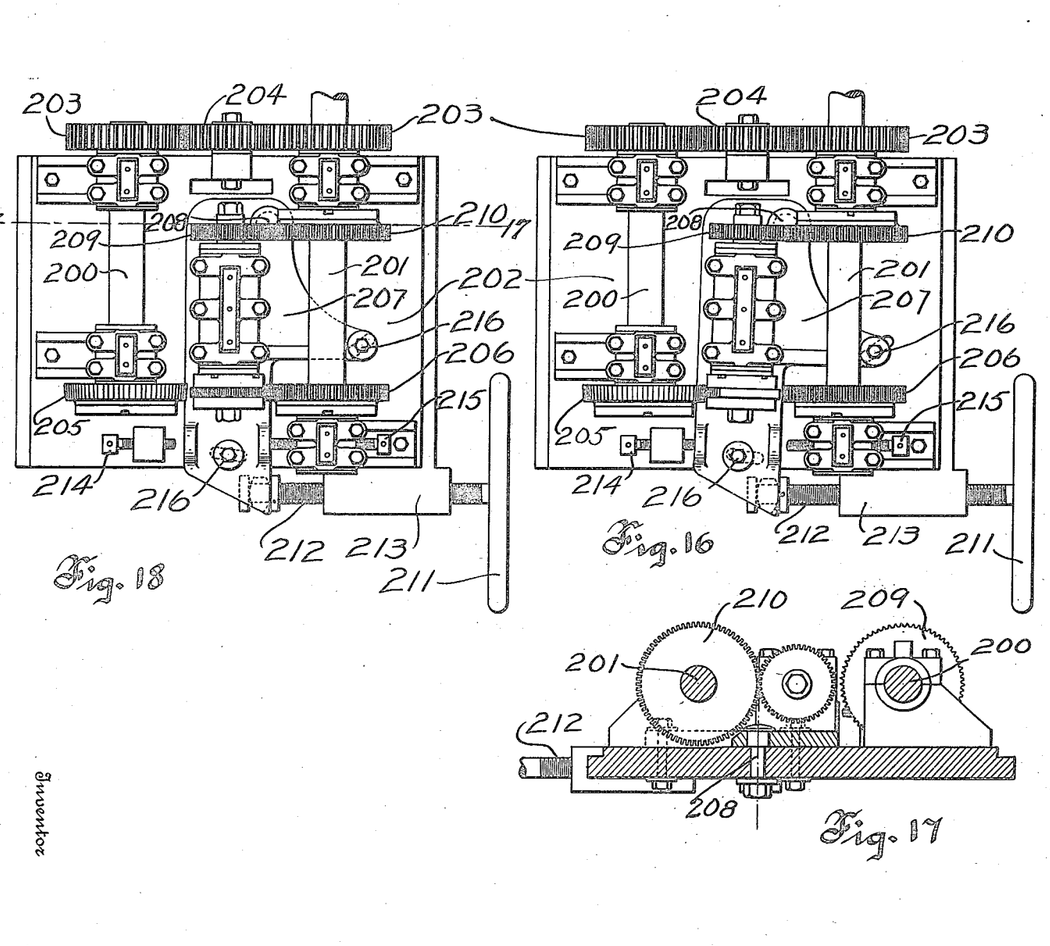
Figs. 16, 17 and 18 are views of the machine which was shown in the patent above referred to, save that the construction is modified so that the speed ratio between the blank and the die-roll shall be fixed.

The mechanism shown in Figs. 16, 17 and 18 will now be described: Shafts 200 and 201 are rotatably mounted in bearings carried by bed plate 202; each shaft has rigidly secured thereto a gear 203, which are connected together by an intermediate gear 204. Shaft 200 carries a toothed roller 205, called hereinafter the breaking-down roller, and shaft 201 carries a toothed roller 206, called hereinafter the finishing roller. The breaking-down and finishing rollers are rigidly secured to their respective shafts. A plate 207 lies upon the bed plate 202 and is pivotally secured thereto at 208. A shaft is journaled in a bearing carried by plate 207, on one end of which provision is made for mounting a blank, substantially the same as has been described in the rack bar machine. A gear 209 is rigidly secured to the other end of the shaft and enmeshed with a gear 210 rigidly secured to shaft 201. The axis of the pivot 208 is in line with the point where the pitch-circles of gears 209 and 210 touch (see Fig. 17, which is a section through line 17—17 Fig. 18). Referring to Figs. 16 and 18 it will be seen that the axis of the pivot 208 is in line with one edge of gear 209. Obviously, the plate 207 can be swung on the pivot 208, from the position shown in Fig. 18 to the position shown in Fig. 16, without varying the distance between the axis of gear 209 and the axis of the pivot 208; therefore, the depth of enmeshment of gears 209 and 210 at the side lying upon the axis of the pivot does not vary when the plate 207 moves, from which it follows that the speed ratio between the blank and the finishing roller is fixed whether the blank is enmeshed with it, with the breaking-down roller, or is anywhere between those extremes. Furthermore, since the shafts 200 and 201 are geared together, the speed ratio between the blank and the breaking-down roller is also fixed. As will be readily understood, the plate 207 is moved to and fro between the shafts by the hand wheel 211 which operates the screw 212 carried by the tapped lug 213 on the base 202. Adjustable stops 214 and 215 limit the movement of the plate 207. Bolts 216 in the plate 207, sliding in slots in the base, prevent the plate lifting up, although affording free lateral movement.

When in operation the machine is driven by means which is not shown, acting upon the shaft 201. A blank is placed in the machine, and by means of the hand wheel it is pressed against the breaking-down roller; having received sufficient of that treatment it is brought over into engagement with the finishing roller. From what has already been said it is obvious that the lineal velocity of the pitch-line of the blank is the same as that of the rollers during the entire tooth-forming operation.

It will be observed that in the first machine the blank remains stationary while the die (the rack) approaches it, while in the latter machine the die-roll is stationary and the blank movable. It is immaterial which moves, the die or the blank, or whether they both move. The essential thing, that which causes the die to form the teeth, is relative movement of approach between the blank and die; that is, movement whereby the pitch-line of the die and that of the blank are made to approach each other.

The contour of a tooth formed in my machine is the product of relative movement of the die and blank and the form of the die, and evidently, the spaces between the teeth on the blank are quite different in shape from the die teeth. This method of forming gear teeth; i. e., causing a tool to form the teeth by virtue of its motion relative to the blank, is called "generating," and the principle has been known for many years. So far as I know, however, the nearest approach to a practical application of the principle has been in what are known as generating gear cutters, in which a cutting tool is given the required movement relative to the blank, concurrently with an independent movement enabling the tool to cut away the metal and form teeth on the blank. As the cutting is intermittent, and as relative movement of the tool and blank occurs between each cut, the surfaces of the teeth are made up of facets arranged in a curve approximating the theoretical curve. Rolling affords continuous instead of intermittent operation on the blank teeth. That is, from the time a die tooth enters until it leaves a space in the blank it acts continuously on the adjacent teeth. By maintaining such relative movement between the blank and die as will be required of the finished blank with reference to a gear it meshes with; e. g., by maintaining fixed velocity ratio, the teeth on the blank will be adapted to run at fixed velocity ratio with another correctly formed gear, or with the die itself.

There is a difference between the action of the rack 121 and the roller 206, though the pitch-line velocity of each equals that of the blank it is acting on. In the latter the addendum; i. e., the portion of the tooth outside of the pitch-circle, travels faster than the pitch-line of the blank. This is particularly true of the ends of the die teeth, while in the rack all parts of a tooth move at the same velocity. In other words, in one the addendum-line is longer than the pitch-line, while in the other they are equal. For this reason if the original diameter of the blank equals its pitch-diameter the end of the rotary die tooth will drag metal along the periphery of the blank in the direction in which it is moving, while the rack tooth will not. To remedy this and insure that teeth formed with the rotary die will not have seams in them the blank may be made enough larger than the pitch circle to make its peripheral velocity equal that of the die. In rolling gears the material displaced below the pitch line about equals the material contained in the addenda, and there will be practically no excess metal in a blank whose original diameter equals its pitch-diameter. To avoid excess material in a blank whose diameter is greater than that of its pitch circle the blank may be made proportionately thinner. As the increase required in the diameter of the blank is inversely proportional to the diameter of the die, a die of large diameter is advantageous.

The portion of a gear tooth outside of the pitch-line is called its addendum and the portion inside or below the pitch-line is called the dedendum. In an ordinary or standard gear tooth the addendum and dedendum are equal in length; i. e., the pitch line divides the length of a tooth into two equal parts. As previously explained, there is an imaginary circle on the blank whose diameter is the same as that of the pitch-circle of the gear 41. If when the rack 121 finishes the formation of the teeth on the blank its pitch-line just touches this circle the teeth will be standard; that is, their addenda and dedenda will be equal. If movement of approach is suspended before the pitch-line of the tooth-forming rack reaches the pitch circle of the blank, the addenda of the blank teeth will be longer than their dedenda; if the pitch-line of the rack goes beyond, inside of the pitch-circle of the blank the dedenda of the teeth formed on the blank will be longer than their addenda. By means of the set screw 106 the machine may be set so that with the same tooth-forming rack gears may be rolled having any desired relative length of addenda and dedenda. Moreover, this adjustability admits of the tooth-forming rack being recut or otherwise restored after it has become worn. That is, the reduction in the height of the rack which would be apt to result from restoring it can be compensated for by the adjusting screw 106. Because of the character of the movement by which the tooth-forming rack approaches the blank; viz., in a straight line perpendicular to the axis of the blank, the teeth are symmetrical from the time they begin to assume form until they are finished. This is not the case in the machine shown in Figs. 16, 17 and 18. In this machine, because of the arcual motion of the blank as it approaches the die-roll, the portions of the die-roll teeth nearest the pivot 208 act on the blank first, and the development of this side of the blank is in advance of the development of the other side. This inequality is never great and eventually vanishes, but not until the axes of the die-roll and blank become parallel.

It is to be understood that the term "blank" does not necessarily mean that it is without teeth. It is still a blank after the breaking down operation is complete. The breaking down process, moreover, may be continued sufficiently long and be sufficiently complete as to require only a smoothing action of the finishing member, and if desired, the gears may be allowed to cool before being subjected to the finishing action. Maintaining uniform speed ratio while finishing the gears not only insures their remaining accurate but it also affords means, within reasonable limits, of correcting inaccuracies. For example, gears which have become slightly inaccurate in hardening may be mounted on one of my machines and restored to the correct form. In this operation it is manifest from the foregoing that at first some teeth will contact, while others will not. Maintaining uniform speed ratio by means independent of the gears being finished is therefore essential to insure the said gears being made accurate. Starting with the gear but partially enmeshed with the toothed member they may be moved toward each other as the finishing progresses.

Having shown and described my invention, and modifications thereof, what I claim is as follows:

1. In a gear rolling machine, means for supporting a rotating blank, a toothed member for rolling teeth on the blank, means for producing relative movement of approach between the blank and toothed member contemporaneous with and for the purpose of rolling said teeth, and means for maintaining equal velocity at the pitch-lines of the blank and toothed member while the teeth are being formed.

2. In a gear forming machine, in combination: means for supporting a rotating gear blank; a toothed member adapted to form teeth on the blank, and means for pressing the blank and toothed member together for the purpose of forming said teeth; and means for separating the blank and the toothed member at intervals during the tooth-forming process and changing the relative lineal position of their pitch-lines, whereby, when they are again pressed together, the several teeth on the blank will be acted upon by different teeth on the toothed member.

3. In a gear forming machine, in combination: means for supporting a rotating gear blank; a toothed member adapted to form teeth on the blank, and means for pressing the blank and toothed member together for the purpose of forming said teeth; and means for changing the relative lineal positions of the pitch-lines of the toothed member and the blank at intervals during the tooth-forming operation, whereby after each such change, the several teeth on the blank will be acted upon by different teeth on the toothed member.

4. In a gear forming machine, in combination: means for supporting a rotating gear blank, a toothed member adapted to form teeth on the blank, and means for pressing the rotating blank and toothed member together for the purpose of forming said teeth; means for separating the blank and the toothed member at intervals during the tooth-forming process and changing the relative lineal position of their pitch-lines, whereby, when they are again pressed together the several teeth on the blank will be acted upon by different teeth on the toothed member; and means for maintaining, while the toothed member is acting upon the blank, equal velocity at the pitch-lines of the blank and the toothed member.

5. In a gear rolling machine, means for supporting a rotating gear blank, a toothed member for rolling teeth on the blank, means for producing relative movement of approach between the blank and toothed member contemporaneous with and for the purpose of rolling said teeth, and means for maintaining synchronous relations between the teeth on the toothed member and the teeth on the blank while said teeth are being formed.

6. In a gear forming machine, in combination: means for supporting a rotating gear blank, a toothed member adapted to form teeth on the blank, and means for pressing the blank and toothed member together for the purpose of forming said teeth; and means for separating the blank and the toothed member at intervals during the tooth-forming process and changing the relative linear position of their pitch-lines, whereby, when they are again pressed together each effective tooth in the tooth-forming member will enter a space in the blank a predetermined number of spaces removed from the one last vacated thereby.

7. In a gear forming machine, in combination: means for supporting a rotating gear blank; a rack bar; and means for pressing the rotating blank and rack bar together, whereby to form teeth on the blank.

8. In a gear forming machine, in combination: means for supporting a rotating gear blank; a rack bar; means for pressing the rotating blank and the rack bar together to form teeth on the blank; and means whereby the tangential displacement of the rack bar with reference to the pitch-line of the blank, due to the rack bar and blank being pressed together, shall be at a velocity equal to the pitch-line velocity of the blank.

9. In a gear forming machine, in combination: a longitudinally movable rack bar; means for supporting a rotating gear blank in a fixed position with reference to the said direction of movement of the rack bar; and means for pressing the rotating blank and the rack bar together to form teeth on the blank.

10. In a gear forming machine, in combination: a longitudinally movable rack bar; rotatable means for supporting a gear blank in a fixed position with reference to the said direction of movement of the rack bar; means for pressing the blank and rack bar together to form teeth on the blank; and means for imparting to the rack bar and the blank supporting means the relative motion necessary for the tooth-forming operation.

11. In a gear forming machine, in combination; a longitudinally movable rack bar and rotatable means for supporting a gear blank in a fixed position with reference to the direction of movement of said rack bar; means for pressing the blank and rack bar together to form the teeth on the blank;

means for imparting to the rack bar and the blank supporting means the relative motion necessary for the tooth forming process, and means whereby said relative motion shall be at a fixed speed ratio.

12. In a gear forming machine, in combination; a rotatable gear, means for supporting a gear blank so it will rotate in unity therewith, and a rack bar enmeshed with said gear; a rack bar adapted to form teeth on the blank, and means for pressing the second rack bar and the blank together for the purpose of forming said teeth; and means whereby the rack bars shall be immovable, longitudinally, with reference to each other.

13. In a gear forming machine, in combination: a rotatable gear and means for supporting a gear blank so it will rotate in unity therewith; a rack bar enmeshed with said gear and a rack bar adapted to form teeth on the blank, said rack bars being immovable, longitudinally, with reference to each other; and means for producing relative movement of approach between the tooth-forming rack bar and the blank, contemporaneous with characteristic relative movement of the rack bar and the blank, whereby teeth are formed on the blank, said movement of approach being effected without varying the depth of enmeshment of the first rack bar and its gear.

14. In a gear forming machine, in combination: a rotatable gear and means for supporting a gear blank so it will rotate in unity therewith; a rack bar enmeshed with said gear and a rack bar adapted to form teeth on the blank, said rack bars being arranged to move longitudinally as a unit; and means for producing relative movement of approach between the tooth-forming rack bar and the blank, contemporaneous with longitudinal movement of the rack bars and rotary movement of the gear and blank, said movement of approach being effected without varying the depth of enmeshment of the first rack bar and its gear.

15. In a gear forming machine, in combination: a rotatable gear and means for supporting a gear blank so it will rotate in unity therewith; a rack bar enmeshed with said gear and a rack bar adapted to form teeth on the blank, said rack bars being arranged to move longitudinally as a unit; and means for moving the tooth-forming rack bar toward the blank, contemporaneous with longitudinal movement of the rack bars and rotary movement of the gear and blank, said movement of the tooth-forming rack bar toward the blank being effected without varying the depth of enmeshment of the first rack bar and its gear.

16. In a gear forming machine, the combination of means for supporting a rotating gear blank, a breaking down rack bar and a finishing rack bar, and means for pressing either rack bar and the blank together to form teeth on the blank.

17. In a gear forming machine, in combination: a rotatable gear and means for supporting a gear blank so it will rotate in unity therewith; a rack bar enmeshed with the gear; a breaking down rack bar and a finishing rack bar, each adapted to form teeth on the blank, each of said rack bars being immovable, longitudinally, with reference to the others; and means for pressing each tooth-forming rack bar and the blank together to form teeth on the blank.

18. In a gear forming machine, in combination: means for rotatably supporting a gear blank; a rack bar, means for imparting reciprocating longitudinal movement thereto, and means for pressing it and the aforesaid blank together, thereby forming teeth on the blank.

19. In a gear forming machine, in combination: means for rotatably supporting a gear blank; a breaking down rack bar, a finishing rack bar and means for imparting reciprocating longitudinal motion to both; and means for pressing either rack bar and the blank together to form teeth on the blank.

20. In a gear forming machine, in combination: means for rotatably supporting a gear blank; a rack bar means for imparting longitudinal reciprocating motion to the rack bar and oscillatory motion to the blank, the pitch-line velocity of the rack bar and blank being equal, and means for pressing the blank and rack bar together to form teeth on the blank.

21. In a gear forming machine, in combination: means for rotatably supporting a gear blank; a breaking down rack bar and a finishing rack bar; means for imparting longitudinal reciprocating motion to the rack bars and oscillatory motion to the blank, the pitch-line velocity of the blank being equal to that of the rack bars; and means for pressing the blank and either rack bar together to form teeth on the blank.

22. In a gear forming machine, in combination: a longitudinally reciprocating rack bar and a rotatably mounted gear enmeshed therewith; means for rotatably supporting a gear blank and for causing it to oscillate about its own axis, but as if it and the gear were a unit; a rack bar arranged to reciprocate longitudinally as if it and the aforesaid rack bar were a unit, and means for pressing said rack bar and blank together, thereby to form teeth on the blank; and means whereby the depth of enmeshment of said first rack bar and its gear shall be invariable while the other rack bar is forming teeth on the blank.

23. In a gear forming machine, in combination: a longitudinally reciprocating rack bar and a rotatably mounted gear enmeshed therewith; means for separating said gear and rack bar at intervals and means for changing their relative positions, thereby causing the teeth of one to engage different teeth on the other after each such change; means for rotatably supporting a gear blank and for causing it to oscillate about its own axis, but as if it and the aforesaid gear were a unit; a rack bar arranged to reciprocate longitudinally as if it and the first rack bar were a unit, and means for pressing said second rack bar and the blank together, thereby to form teeth on the blank; means whereby the depth of enmeshment of said first gear and its rack bar shall be invariable while the other rack bar is acting upon the blank; and means for separating the blank and the tooth-forming rack bar at intervals, to permit the aforesaid change in the relative positions of the gear and the first rack bar.

24. In a gear forming machine, in combination: a rack bar, a gear enmeshed therewith, and means for producing reciprocal characteristic relative movement between them, said movement in one direction being sufficient to carry them quite apart; means for retiring one or more teeth in the rack bar when its relative movement is in one direction, and restoring said teeth when the movement is in the opposite direction, whereby, when the rack bar reëngages the gear, its fixed teeth will engage other teeth on the gear than before; means for supporting a gear blank so that it will oscillate about its own axis, but as if it and the aforesaid gear were a unit; a rack bar arranged to reciprocate longitudinally as if it and the first rack bar were a unit; and means for pressing the second rack bar and the blank together, while the first rack bar is enmeshed with its gear, thereby to form teeth on the blank.

25. In a gear forming machine, in combination: a rack bar, a gear enmeshed therewith, and means for producing reciprocal characteristic relative movement between them, said movement in one direction being sufficient to carry them quite apart; means for retiring one or more teeth in the rack bar when its relative movement is in one direction, and restoring said teeth when the movement is in the opposite direction, whereby, when the rack bar reëngages the gear, its fixed teeth will engage other teeth on the gear than before; means for supporting a gear blank so that it will oscillate about its own axis, but as if it and the aforesaid gear were a unit; a rack bar arranged to reciprocate longitudinally as if it and the first rack bar were a unit; means for pressing the second rack bar and blank together, thereby to form teeth on the blank; and means for separating them while the first rack bar and its gear are separated.

26. In a gear forming machine, in combination: a rotatable support for a gear blank, means for fixing a blank thereto, and a gear rigidly secured to said support; a rectilineally movable carriage and a rack bar secured thereto parallel with its line of movement, and enmeshed with said gear; means for imparting reciprocating motion to said carriage; a tooth-forming rack bar carried by the carriage, said rack bar lying parallel with the aforesaid rack bar and opposite the blank; and means whereby the tooth-forming rack bar may be moved toward and pressed against the blank to form teeth thereon.

27. In a gear forming machine, in combination: a rotatable support for a gear blank, means for fixing a blank thereto, and a gear rigidly secured to said support; a rectilineally movable carriage and a rack bar secured thereto parallel with its line of movement, and enmeshed with said gear; means for imparting reciprocating motion to said carriage; a pair of tooth-forming rack bars, one for breaking down and one for finishing, carried by the carriage, said rack bars lying parallel with the aforesaid rack bar; means for moving the tooth-forming rack bars laterally so that either of them can be placed opposite the blank; and means whereby the tooth-forming rack bars may be moved toward and either of them pressed against the blank to form teeth thereon.

28. In a gear forming machine, in combination: a rotatable support for a gear blank, means for fixing a blank thereto, and a gear rigidly secured to said support; a rectilineally movable carriage and a rack bar secured thereto parallel with its line of movement, and enmeshed with said gear; means for imparting reciprocating motion to the carriage, said motion being of sufficient extent to cause the rack bar to move quite out of the gear, and means for revolving said gear somewhat before the rack bar reënters, whereby the teeth of the rack bar will engage different teeth on the gear from those last vacated; a tooth-forming rack bar carried by the carriage, parallel with the aforesaid rack bar and opposite the blank; means for moving the tooth-forming rack bar with reference to the carriage and forcing it against the blank to form teeth thereon, and independent means for withdrawing the tooth-forming rack bar from the blank while the other rack bar is out of gear, thereby permitting the rotation of the gear which occurs at that time as aforesaid.

29. In a gear forming machine, in combination: a rotatable support for a gear blank, means for fixing a blank thereto, and a gear rigidly secured to said support; a rectilineally movable carriage and a rack bar secured thereto parallel with its line of movement, and enmeshed with said gear; means for imparting reciprocating motion to the carriage, said motion being of sufficient extent to cause the rack bar to move quite out of the gear; means for temporarily adding one or more teeth to the rack bar while it is disengaged from the gear, whereby as the carriage returns, the gear is rotated, so that when its fixed teeth reëngage the gear they will engage other teeth than those last engaged; a tooth-forming rack bar carried by the carriage, parallel with the aforesaid rack bar and opposite the blank; means for moving the tooth-forming rack bar with reference to the carriage and forcing it against the blank to form teeth thereon, and independent means for withdrawing the tooth-forming rack bar from the blank while the other rack bar is out of the gear, thereby permitting the rotation of the gear by the added teeth as aforesaid.

30. In a gear forming machine, in combination: a longitudinally reciprocating rack bar and a rotatably mounted gear enmeshed therewith; means for separating said gear and rack bar at intervals and means for changing their relative positions, thereby causing the teeth of one to engage different teeth on the other after each such change; means for rotatably supporting a gear blank and for causing it to oscilliate about its own axis, but as if it and the aforesaid gear were a unit; a rack bar arranged to reciprocate longitudinally as if it and the first rack bar were a unit, and means for pressing the second rack bar and the blank together, thereby to form teeth on the blank; and automatic means, independent of the means for pressing the rack bar and blank together for separating the rack bar and blank at the time when the gear and the first rack bar are separated.

31. In a gear forming machine, in combination: means for supporting a rotating gear blank; a rack bar; means for pressing the blank and rack bar together, whereby to form teeth upon the blank; and means for temporarily separating the rack bar and blank at intervals during the tooth-forming operation and changing the relative lineal positions of their pitch-lines, whereby, when they are again pressed together, the several teeth on the blank will be acted upon by different teeth on the rack bar.

32. In a gear forming machine, in combination: a breaking-down rack bar, and a finishing rack bar; means for supporting a rotating gear blank; means for pressing either one of the rack bars and the blank together for the purpose of forming teeth on the blank; and means for temporarily separating the blank and the rack bar at intervals during the tooth-forming operation and changing the relative lineal positions of their pitch-lines, whereby, when they are again pressed together the several teeth on the blank will be acted upon by different teeth on the rack bar.

33. In a gear forming machine, in combination: means for supporting a rotating gear blank; a rack bar; means for pressing the rack bar and the rotating blank together for the purpose of forming teeth on the blank; and means for separating and reëngaging the rack bar and blank at intervals during the tooth-forming operation.

34. In a gear rolling machine, means for supporting a gear blank, a toothed member, means for producing relative movement of approach between the blank and the toothed member and contemporaneously imparting motion to the toothed member, whereby to roll teeth on the blank, and means whereby, while formation of the teeth proceeds, synchronous relations are maintained between the teeth on the toothed member and those on the blank.

35. In a gear rolling machine in combination: rotary means for carrying a gear blank the teeth on which have been partially formed, a toothed member enabled by rolling engagement therewith to finish the teeth on said blank, means for producing relative movement of approach between the blank and toothed member contemporaneous with and for the purpose of finishing said teeth, and means for maintaining synchronous relations between the teeth on the toothed member and the teeth on the blank while said teeth are being finished.

36. In a gear rolling machine, in combination: rotary means for carrying a gear blank having partially finished teeth, a toothed member enabled by rolling engagement therewith to finish said teeth, means for producing relative movement of approach between the blank and said toothed member for the purpose of bringing their respective teeth into contact, and means for maintaining synchronous relations between the teeth on the toothed member and those on the blank as they approach each other, whether the teeth are in contact or not and regardless of the condition of the teeth on the blank.

37. A machine for generating teeth on gears, comprising a support for a gear blank, a generating tool, means for imparting relative movement of approach between the blank and tool concurrently with the same relative movement between them as will be required between the blank and the gear it mates with, whereby the tool is caused to generate teeth on the blank, and means independent of the blank and tool for maintaining the latter relative movement.

38. A machine for generating teeth on gears, comprising a support for a gear blank, a forging tool, and means whereby the tool is caused to generate teeth on the blank whose contours are the product of relative movement of the tool and blank and the shape of the tool; said means comprising means for producing movement of approach between the blank and tool, and means for contemporaneously producing and maintaining the same relative movement of the blank and tool as will be required of the finished blank relative to the gear it meshes with.

39. A machine for generating teeth on gears, comprising a support for a blank, a rolling tool, means whereby the tool is caused to roll teeth on the blank having a curvature which is the product of the shape of the tool and relative movement of the tool and blank, and means for maintaining invariable relative movement of the tool and blank while the teeth are generated.

40. A machine for generating teeth on gears, comprising a support for a blank, a forging tool, means whereby the tool is caused to forge teeth on the blank having a curvature which is the product of the shape of the tool and relative movement of the tool and blank, and means for maintaining invariable relative movement of the tool and blank while the teeth are generated.

41. A machine for generating gear teeth, comprising a support for a blank, a forging tool, and means whereby the tool is caused to forge teeth on the blank having a contour which is the product of the shape of the tool and invariable relative movement of the tool and blank.

42. In a gear rolling machine, means for supporting a gear blank, a die-member whose pitch-line and addendum-line are equal, means for pressing the die-member and blank together, and means for contemporaneously imparting relative movement whereby to bring the die-member into progressive engagement with the blank and form teeth thereon.

43. In a gear rolling machine, means for supporting a rotating gear blank, a die-member whose pitch-line and addendum-line are equal, and means for pressing the die-member and rotating blank together to form teeth on the blank.

44. A machine for generating teeth on gears, comprising a support for a gear blank, a generating tool capable of acting continuously, means for imparting relative movement of approach between the blank and tool concurrently with the same relative movement between them as will be required between the blank and the gear it mates with, whereby the tool is caused to generate teeth on the blank, and means independent of the blank and tool for maintaining the latter relative movement.

45. A machine fro generating teeth on gears, comprising a support for a gear blank, a generating tool capable of acting simultaneously on the entire width of the working face of the blank, means for imparting relative movement of approach between the blank and tool concurrently with the same relative movement between them as will be required between the blank and the gear it mates with, whereby the tool is caused to generate teeth on the blank, and means independent of the blank and tool for maintaining the latter relative movement.

46. In a gear rolling machine, means for supporting a blank, a toothed member for rolling teeth on the blank, and means for rolling teeth on the blank with said member, whose addenda and dedenda have any desired length.

47. In a gear rolling machine, means for supporting a blank, a toothed die for rolling teeth on the blank, means for rolling the blank and die together while preventing lineal advance or retrogression of the pitch-line of the die with reference to the prospective pitch-line of the blank, and means for producing relative movement of approach between the blank and die, said means being adapted to continue the movement of approach until said pitch-lines have attained any desired relative position, even until they have passed and are receding from each other.

48. In a gear rolling machine, means for supporting a blank, a toothed die whose pitch-line and addendum-line are equal, means for rolling the blank and die together so that there is neither lineal advance nor retrogression of the pitch-line of the blank with reference to the prospective pitch-line of the blank, and means for producing relative movement of approach between the blank and die, said means being adapted to continue the movement of approach until said pitch-lines have attained any desired relative position, even until they have passed and are receding from each other.

49. In a gear rolling machine, a support for a tooth-forming die, a support for a blank, means for producing relative movement between said supports whereby to effect rolling engagement between a die carried by one and a blank carried by the other, means for producing relative movement of approach between said supports, whereby to press the die teeth into the blank, said means being adapted to continue the movement of approach until the teeth of the die have been sunk to a predetermined depth in the blank, and means for maintaining synchronous relations between the die teeth and the developing teeth on the blank.

50. In a gear rolling machine, a support for a tooth-forming die, a support for a blank gear, means for producing relative movement between said supports whereby to cause the die and a blank carried by the holder to roll against each other, and means for producing relative movement of approach between the die and support, whereby to press the die teeth into the blank and form teeth thereon, said means effecting said movement of approach without otherwise altering the relative positions of the die and support, and being adapted to continue the movement of approach until the die teeth have attained any desired position with reference to the blank.

In testimony whereof I affix my signature in the presence of two subscribing witnesses.

HAROLD N. ANDERSON.

Witnesses:
J. B. HAYWARD,
F. K. FASSETT.